Feb. 16, 1971   E. DOBELIN   3,563,615

SHAFT BEARING ASSEMBLY

Filed May 2, 1969

INVENTOR
Eberhard DOBELIN
By his ATTORNEY

United States Patent Office 3,563,615
Patented Feb. 16, 1971

3,563,615
SHAFT BEARING ASSEMBLY
Eberhard Dobelin, Villingen, Germany, assignor to Kienzle Apparate G.m.b.H., Villingen, Black Forest, Germany
Filed May 2, 1969, Ser. No. 821,264
Claims priority, application Germany, May 3, 1968, P 17 50 449.3
Int. Cl. F16c 13/00
U.S. Cl. 308—15                 5 Claims

ABSTRACT OF THE DISCLOSURE

A journal portion of a shaft is inserted through an open slot in a support wall into an open bearing, and retained in the same by an arm which resiliently yields laternally during insertion of the shaft. The journal portion is formed by a circular groove preventing axial displacement of the shaft in the open bearing, and the other end of the shaft is inserted in axial direction into a bearing bore in another support wall. The longitudinally rigid arm blocks removal of the journal portion from the open bearing.

BACKGROUND OF THE INVENTION

The present invention relates to the assembly of a shaft in bearings of support walls.

In the manufacture of instruments, it is usual to mount axle shafts and rotary shafts directly in bearing bores in thin support walls, which has not only the advantage of being inexpensive, but also facilitates replacement of the shaft, and reduces the time required for assembly.

In most cases, the shaft is threaded through one bearing bore, then threaded through center bores in parts which have to be rotatably mounted on the shaft, and finally threaded through a bearing bore in another support wall, and then secured against axial movement. If the parts which are rotatably mounted on a shaft are of small diameter, it is sometimes possible to insert the shaft with the assembled part in a slanted position first into one and then into the other bearing bore.

It is also known to provide a slot in one of the support walls through which the shaft is inserted until it is located at the inner end of the slot, whereupon a bushing is axially inserted into this inner end of the slot to form a bearing for the shaft. Due to the greater diameter of the bushing, it cannot pass through the slot. All arrangements according to the prior art require means for preventing axial movement of the shaft, and in accordance with the prior art, split rings or like abutment members are secured in annular grooves of the shaft.

The shaft bearing assemblies according to the prior art require several parts and a number of assembly operations in order to obtain proper bearing support of the shaft.

SUMMARY OF THE INVENTION

It is one object of the invention to overcome the disadvantages of shaft bearing assemblies according to the prior art, and to provide a shaft bearing assembly which consists of a minimum of parts, and can be quickly assembled by unskilled workers.

Another object of the invention is to mount a unit including a shaft and other parts rotatably mounted on the shaft, in bearings provided in two support walls between which the rotatable parts are located.

Another object of the invention is to insert the journal portion of a shaft into an open bearing while resiliently displacing a retaining abutment, so that the abutment resiliently returning to its normal position holds the journal portion in the open bearing.

In accordance with one aspect of the invention, a reduced journal portion of a shaft is mounted in an open bearing in a support wall, and retained in the open bearing by retaining portions of the support wall. Preferably, the reduced journal portion and the annular groove have an axial length corresponding to the thickness of the support wall so that the shaft cannot be axially displaced when mounted in the open bearing.

In accordance with another aspect of the invention, a journal portion of the shaft is inserted through a narrow throat into an open bearing, and resiliently displaces a flexible arm which after insertion of the journal portion into the open bearing, returns to its normal position located opposite the surface of the open bearing for retaining the journal portion in the open bearing.

In the preferred embodiment, the flexible retaining arm, as well as the journal portion of reduced diameter are provided, together with another retaining abutment on the other side of the throat, and the open bearing is axially aligned with a bearing bore in another support wall. The shaft bearing assembly according to the invention is particularly suited for mounting non-rotatable shafts serving as axles for rotary parts, such as the number wheels of a register. However, the shaft bearing assembly of the invention can also be used for rotary shafts, provided that the speed of rotation and the bearing loads are not too high.

The particular advantage of the invention resides in that the assembly of a shaft, or of a unit including a shaft and rotary parts thereon, can be securely mounted on support walls by a single assembly operation which can be carried out with one hand. Additional split rings and bushings are not required, which permits to reduce the total length of the shaft portions projecting from the support walls so that in some cases the mounting of the supporting means with the support walls and assembled unit into a housing is facilitated.

In accordance with the invention, at least one support wall is formed with a cutout comprising an assembling portion in the form of a slot having a predetermined width and an outer end opening at one edge of the support wall, and an open bearing portion which has a predetermined diameter, namely the diameter of the journal portion of a shaft, which is preferably formed by a circular groove in an end portion of the shaft. A resilient retaining arm forms one side of the assembling portion of the cutout and has an inner end formed as a retaining abutment located opposite the open side of the open bearing portion spaced the diameter of the journal portion from the opposite surface of the open bearing portion. At the same time, the retaining abutment is spaced from the other side of the assembling portion or slot, a distance less than the diameter of the journal portion so as to form a throat between the assembling portion or slot and the open bearing portion.

When a unit including a shaft having the journal portion is to be assembled, the journal portion is inserted through the throat while the resilient retaining arm resiliently yields, and when the journal portion is located in the open bearing, the resilient arm returns to its normal position in which its end portion forms part of the bearing and retains the journal portion of the shaft in the same.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
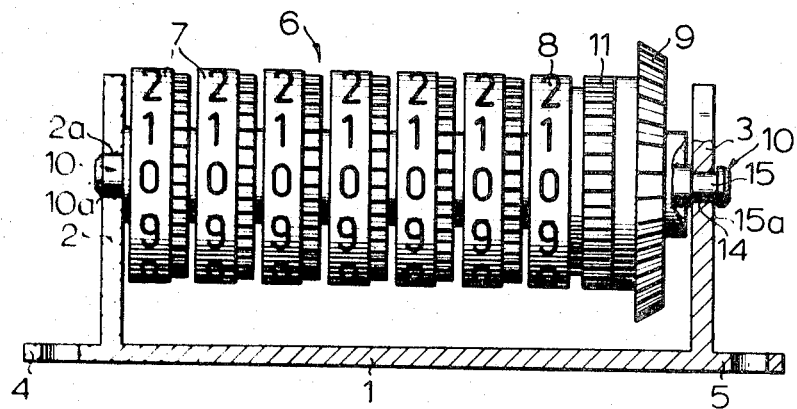
FIG. 1 is a vertical sectional view illustrating a preferred embodiment of the invention.

Referring now to the drawing, a supporting means includes a base plate 1, and two vertical and parallel support walls 2 and 3. Base plate 1 has attaching lugs 4 and 5 provided with bores for attaching screws, not shown, by which the supporting means can be secured to a housing.

A shaft 10 has an end portion 10a located in a bearing bore 2a of support wall 2, and a second end portion provided with a circular groove 15a forming a journal portion 15 having a reduced diameter. Journal portion 15 of shaft 10 is mounted in an open bearing 14 which has a part-circular bearing surface 14a whose diameter is substantially the same as the diameter of the reduced journal portion 15. Bearing bore 2a and the open bearing 14 portion 15. Bearing bore 2a and the open bearing 14 register 6 is rotatably mounted on shaft 10 and comprises an ordinal set of number wheels 7, and a first number wheel 8 to which the ratchet wheel 11 and a bevel gear 9 are fixedly secured for rotation. The number wheel 8 of the unit order is driven from bevel gear 9, and a pawl, not shown, cooperates with ratchet wheel 11 to permit rotation of the number wheels only in one direction.

As shown in FIG. 1, a hub portion of the number wheel of the highest order, and a hub portion of bevel gear 9 are spaced a small distance from the inner surfaces of support walls 2 and 3 so that only very limited axial displacement of the register is possible.

The open bearing 14 is part of a cutout 22 which includes an assembling portion or slot 13 communicating with the open bearing portion 14 through a throat 23 formed between a retaining projection 17 of edge 16 of assembling slot 13, and a retaining abutment 21 at the inner end of a flexible and resilient retaining arm 20 of wall 3. Cutout 22 further has a recess portion 19 on the side of the resilient arm 20 remote from the assembling slot 13. Resilient arm 20 forms the other edge of the assembling slot 13.

As noted above, a bearing formed by part-circular surface 14a of the open bearing 14 and by the retaining abutment 17, has the same diameter as journal portion 15. The throat 23 has a width which is less than this diameter. The remaining portion of the assembling slot 13 has a width which is greater than the diameter of the journal portion. The face 21a of retaining abutment 21 abuts the edge 24 of recess 19 when it is displaced during insertion of the journal portion 15 through the throat 23.

The distance between the face 21a of abutment 21 and the edge 24 is selected so that the resilient arm 20 is stopped by edge 24 when the width of the throat 23 has been expanded to the width or diameter of the journal portion 15, as will happen during insertion of the journal portion 15 through the assembling slot 13 and throat 23 into the open bearing 14.

Figure 2:
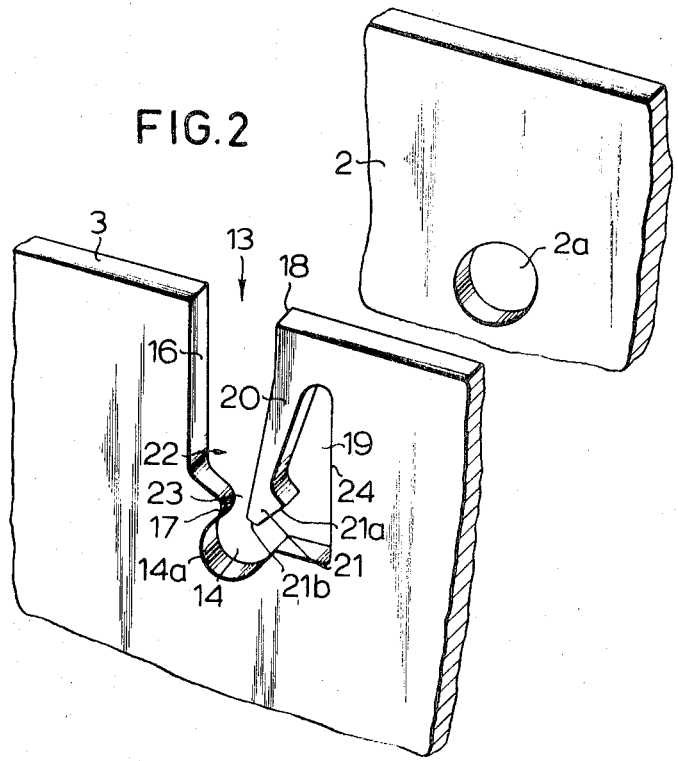
FIG. 2 is a fragmentary perspective view illustrating two support walls constructed in accordance with the invention.

When the journal portion is placed in the open bearing 14 and has passed through the throat 23, the laterally displaced resilient arm 20 resiliently returns to its normal position illustrated in FIG. 2 in which its end face 21b is located at the open side of the open bearing 14, spaced the diameter of journal portion 15 from the opposite portion of the part cylindrical surface 14a, so that end face 21b retains journal portion 15 in the open bearing 14.

When the device is to be assembled, the register 6 is first mounted on shaft 10 to form a unit with the same.

Since register 6 has an axial length which is almost the same as the distance between the inner faces of walls 2 and 3, it is not possible to insert the shaft end portion 10a into the bearing bore 2a in a slanted position of the unit. The other end portion of shaft 10 is inserted through the assembling slot 13 until shaft 10 is almost parallel to the base plate 1, whereupon the unit with shaft 10 is axially shifted to insert shaft portion 10a into bearing bore 2a of support wall 2. This axial displacement of shaft 10 places the reduced journal portion 15 in the plane of support wall 13 so that journal portion 15 can be pressed through the throat 23 while arm 20 resiliently yields until its face 21a abuts the edge 24 so that throat 23 has a width corresponding to the diameter of the journal portion 15.

When journal portion 15 is located in the open bearing 14, the resilient arm 20 returns to its normal position and, due to its longitudinal rigidity, retains journal portion 15 in the open bearing 14, further aided by the retaining abutment 17 on the other side of throat 23. For removal of the journal portion, retaining arm must be manually laterally displaced.

Since the journal portion and the circular groove 15a forming the same have an axial length corresponding to the thickness of support wall 3, shaft 10 cannot be axially shifted when journal portion 15 is located in the open bearing 14 due to the fact that the circular faces bounding circular recess 15a on the sides, now abut the opposite surfaces of support wall 3.

Since the movement of the flexible arm 20 is limited by edge 24 when the width of throat 23 is substantially equal to the diameter of journal portion 15, it is not possible to insert a thicker portion of shaft 10 through throat 23 into open bearing 14.

It will be understood that each of the elements described above, or two or more together, may also find a useful application in other types of shaft bearing assemblies differing from the types described above.

While the invention has been illustrated and described as embodied in an assembly in which a reduced journal portion of a shaft is inserted through an assembling slot into an open bearing while resiliently displacing a retaining arm, it is not intended to be limited to the details shown, since various modifications and structural changes may be made without departing in any way from the spirit of the present invention.

What is claimed as new and desired to be protected by Letters Patent is set forth in the appended claims.

1. Shaft bearing assembly comprising, in combination, a unit including a shaft having a journal with a predetermined diameter; and supporting means including a support wall formed with a cutout comprising an assembling slot portion, a part-circular open bearing portion bounded by a part-circular edge portion of said support wall and being open toward said assembling slot portion between the ends of said part-circular edge portion, said part-circular edge portion having said predetermined diameter, and said journal being located in said bearing portion, said support wall including a laterally resilient longitudinally rigid retaining arm projecting toward said bearing portion and having on one side a lateral edge bounding one side of said assembling slot portion and having a normal position spaced from the other side of the same a distance less than said diameter of said journal so that said retaining arm is laterally resiliently displaced by said journal when the same is inserted through said assembling slot portion into said bearing portion whereupon said retaining arm returns resiliently to said normal position, said retaining arm having an end face spaced in said normal position from the opposite portion of said part-circular edge a distance equal to said diameter whereby said journal is rotatably supported by said part-circular edge and said end face, and is retained by said longitudinally rigid retaining arm against movement in the direction of said retaining arm out of said bearing portion into said assembling slot until said arm is manually laterally displaced.

2. Shaft bearing assembly as claimed in claim 1 wherein said retaining arm extends in a direction which is substantially radial in relation to said part-circular edge; and wherein said end face is located between said ends of said part-circular edge spaced from the same.

3. Shaft bearing as claimed in claim 1 wherein said cutout has a recess portion on the other side of said retaining arm; wherein said retaining arm, when laterally resiliently displaced by the inserted journal, abuts an opposite edge of said support wall bounding said recess portion when said lateral edge of said retaining arm is spaced a distance equal to said predetermined diameter from said other side of said assembling slot portion; and wherein said shaft has an annular groove forming said journal, said groove and journal having an axial length equal to the thickness of said support wall, and the adjacent portions of said shaft having a diameter greater than said predetermined diameter of said journal so that said retaining arm can not be displaced by said adjacent portions of said shaft far enough to permit passage of the same into said bearing portion.

4. Shaft bearing assembly as claimed in claim 1 wherein said supporting means includes another support wall spaced from said support wall, and having a bearing bore aligned with said part-circular bearing portion along a common axis; wherein said unit has said journal at one end, and another shaft portion at the other end turnably mounted in said bearing bore.

5. Shaft bearing assembly as claimed in claim 1 wherein said other side of said assembling slot portion has a projecting retaining abutment at one end of said part-circular edge and forming a throat with said lateral edge of said retaining arm.

References Cited
UNITED STATES PATENTS

| | | | |
|---|---|---|---|
| 3,042,461 | 7/1962 | Smith | 308—15 |
| 3,215,476 | 11/1965 | Jacobs | 308—15 |
| 3,307,291 | 3/1967 | Cremer | 308—15 |
| 3,333,905 | 8/1967 | Hennequin | 308—15 |
| 3,399,934 | 9/1968 | Kopp | 308—15 |
| 3,418,705 | 12/1968 | Sours | 308—15 |
| 3,451,733 | 6/1969 | Scott, Jr. et al. | 308—15 |

FRED C. MATTERN, JR., Primary Examiner

W. S. RATLIFF, JR., Assistant Examiner